US010812844B2

(12) United States Patent
Takahashi

(10) Patent No.: US 10,812,844 B2
(45) Date of Patent: Oct. 20, 2020

(54) TRANSMITTING APPARATUS, RECEIVING APPARATUS, AND DATA PROCESSING METHOD

(71) Applicant: SONY SEMICONDUCTOR SOLUTIONS CORPORATION, Atsugi-shi (JP)

(72) Inventor: Kazuyuki Takahashi, Chiba (JP)

(73) Assignee: SONY SEMICONDUCTOR SOLUTIONS CORPORATION, Atsugi-shi (JP)

(*) Notice: Subject to any disclaimer, the term of this patent is extended or adjusted under 35 U.S.C. 154(b) by 0 days.

(21) Appl. No.: 16/480,365

(22) PCT Filed: Feb. 21, 2018

(86) PCT No.: PCT/JP2018/006115
§ 371 (c)(1),
(2) Date: Jul. 24, 2019

(87) PCT Pub. No.: WO2018/163813
PCT Pub. Date: Sep. 13, 2018

(65) Prior Publication Data
US 2019/0387260 A1    Dec. 19, 2019

(30) Foreign Application Priority Data
Mar. 7, 2017 (JP) ................... 2017-042721

(51) Int. Cl.
*H04N 7/173* (2011.01)
*H04N 21/2385* (2011.01)
(Continued)

(52) U.S. Cl.
CPC ......... *H04N 21/2385* (2013.01); *H04B 7/026* (2013.01); *H04N 21/2362* (2013.01);
(Continued)

(58) Field of Classification Search
None
See application file for complete search history.

(56) References Cited

U.S. PATENT DOCUMENTS

2016/0301952 A1    10/2016  Loghin et al.
2018/0026846 A1*    1/2018  Walker ................ H04H 20/423
                                                                              370/228
(Continued)

FOREIGN PATENT DOCUMENTS

JP        2008-124665 A    5/2008
WO    WO 2015/087703 A1    6/2015

OTHER PUBLICATIONS

International Search Report dated Apr. 24, 2018 in PCT/JP2018/006115 filed Feb. 21, 2018.
(Continued)

*Primary Examiner* — William J Kim
(74) *Attorney, Agent, or Firm* — Oblon, McClelland, Maier & Neustadt, L.L.P.

(57) ABSTRACT

The present technology relates to a transmitting apparatus, a receiving apparatus, and a data processing method each of which enables channel bonding to be more reliably performed.
There is provided a transmitting apparatus generating physical layer signaling including first identification information with which a group of frequency bands constituting channel bonding is identified, and second identification information with which the frequency band belonging to the group is identified; and transmitting a broadcasting signal which includes the physical layer signaling and is changed in frequency band thereof by a relay apparatus by utilizing a predetermined frequency band. The present technology, for example, can be applied to a broadcasting system utilizing channel bonding.

20 Claims, 12 Drawing Sheets

(51) Int. Cl.
*H04B 7/026* (2017.01)
*H04N 21/2362* (2011.01)
*H04N 21/434* (2011.01)
*H04N 21/61* (2011.01)
*H04N 21/845* (2011.01)

(52) U.S. Cl.
CPC ....... *H04N 21/4343* (2013.01); *H04N 21/615* (2013.01); *H04N 21/8456* (2013.01)

(56) References Cited

U.S. PATENT DOCUMENTS

2018/0249167 A1* 8/2018 Deshpande ............ H04N 19/46
2019/0289340 A1* 9/2019 Kwak ................ H04N 21/4345
2019/0327500 A1* 10/2019 Yang ................... H04N 21/236

OTHER PUBLICATIONS

"ATSC Standard: Physical Layer Protocol (A/322)," Advanced Television Systems Committee, Feb. 9, 2017, 44 Pages.
Sunsik Roh, "Design of Out-of-Band Protocols to Transmit UHDTV Contents in the CATV Network," International Journal of Communications, Network and System Science, vol. 5, No. 5, May 2012, 12 Pages.
Lothar Stadelmeier, et al., "Channel Bonding for ATSC3.0," IEEE Transactions on Broadcasting, vol. 62, No. 1, Mar. 2016, 10 Pages.
"ATSC Standard: Physical Layer Protocol (A/322)," Advanced Television Systems Committee, Jun. 6, 2017, 43 Pages.

* cited by examiner

FIG. 2

| Syntax | No. of Bits | Format |
|---|---|---|
| L1D_Detail_signaling() { | | |
|   L1D_version | 4 | uimsbf |
|   L1D_num_rf | 3 | uimsbf |
|   for(L1D_rf_id=1..L1D_num_rf) { | | |
|     L1D_rf_frequency | 19 | uimsbf |
|   } | | |

L1D_Detail Signaling Fields and Syntax

FIG. 5

| Syntax | No. of bits | format | Semantics |
|---|---|---|---|
| L1D_Detail_signaling() { | | | |
| L1D_version | 4 | uimsbf | VERSION INFORMATION OF L1D SIGNALING |
| L1D_num_rf | 3 | uimsbf | THE NUMBER OF FREQUENCY BANDS CONSTITUTING CHANNEL BONDING |
| if(L1D_num_rf>0) { | | | |
| L1D_bsid | 16 | uimsbf | BS_ID WITH WHICH GROUP OF FREQUENCY BANDS CONSTITUTING CHANNEL BONDING IS IDENTIFIED |
| L1D_rf_id | 3 | uimsbf | ID WITH WHICH FREQUENCY BAND BELONGING TO GROUP CONSTITUTING CHANNEL BONDING IS IDENTIFIED |
| } | | | |
| ... | | | |

FIG. 6

| Syntax | No. of bits | format | Semantics |
|---|---|---|---|
| L1D_Detail_signaling() { | | | |
| L1D_version | 4 | uimsbf | VERSION INFORMATION OF L1D SIGNALING |
| L1D_num_rf | 3 | uimsbf | THE NUMBER OF FREQUENCY BANDS CONSTITUTING CHANNEL BONDING |
| for(i=1;i<L1D_num_rf;i++) { | | | |
| L1D_bsid | 16 | uimsbf | BS_ID WITH WHICH GROUP OF FREQUENCY BANDS CONSTITUTING CHANNEL BONDING IS IDENTIFIED |
| L1D_rf_id | 3 | uimsbf | ID WITH WHICH FREQUENCY BAND BELONGING TO GROUP CONSTITUTING CHANNEL BONDING IS IDENTIFIED |
| } | | | |
| ... | | | |

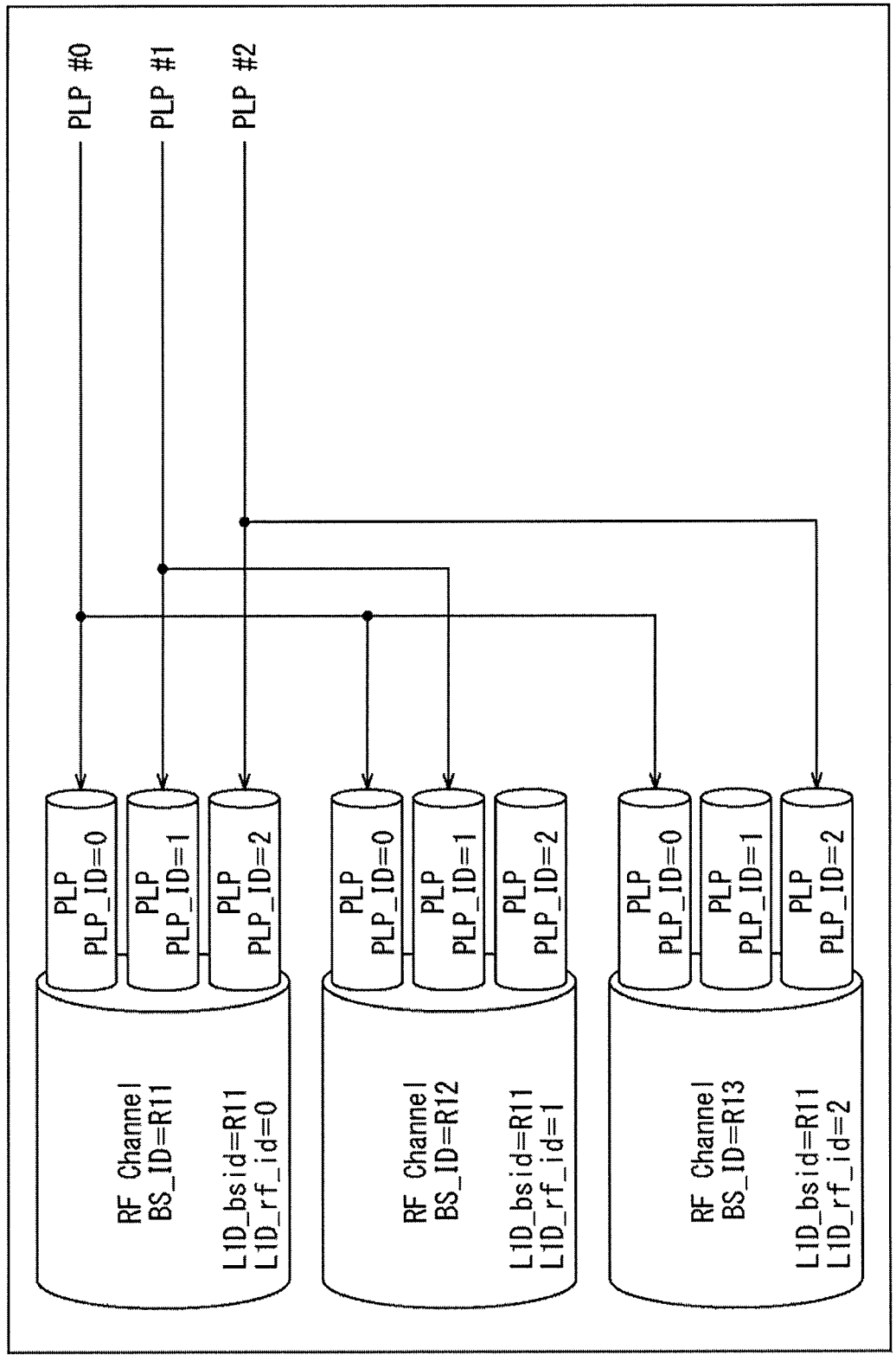

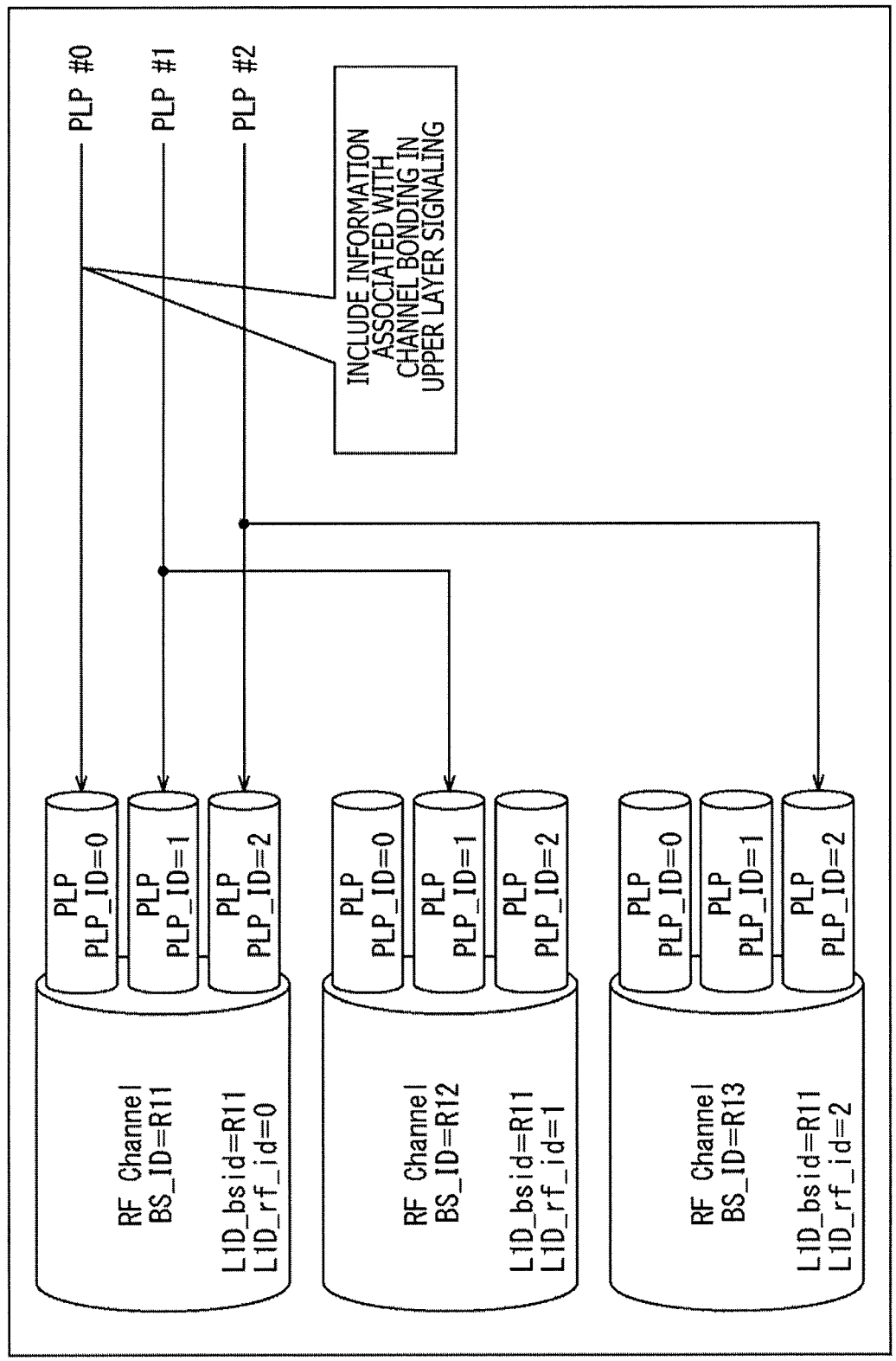

TRANSMITTING APPARATUS, RECEIVING APPARATUS, AND DATA PROCESSING METHOD

TECHNICAL FIELD

The present technology relates to a transmitting apparatus, a receiving apparatus, and a data processing method, and more particularly to a transmitting apparatus, a receiving apparatus, and a data processing method each of which enables channel bonding to be more reliably performed.

BACKGROUND ART

In the digital broadcasting, channel bonding is known in which a plurality of channels (frequency bands) is bonded to be used. For example, even in an ATSC (Advanced Television Systems Committee) 3.0 as one of the next-generation terrestrial broadcast standards, the channel bonding is prescribed (e.g., refer to NPL 1).

CITATION LIST

Non Patent Literature

[NPL 1]
ATSC Standard: Physical Layer Protocol (A/322)

SUMMARY

Technical Problem

In the case where a broadcasting signal is transmitted by utilizing the channel bonding, when a frequency band is changed in a relay apparatus which relays the broadcasting signal, a receiving apparatus may not detect a signal constituting the channel bonding, in some cases. For this reason, a proposal for more reliably performing the channel bonding has been desired.

The present technology has been made in the light of such a situation, and it enables channel bonding to be more reliably performed.

Solution to Problem

A transmitting apparatus of a first aspect of the present technology is a transmitting apparatus including: a generation section generating physical layer signaling including first identification information with which a group of frequency bands constituting channel bonding is identified, and second identification information with which a frequency band belonging to the group is identified; and a transmitting section transmitting a broadcasting signal which includes the physical layer signaling and is changed in frequency band thereof by a relay apparatus by utilizing a predetermined frequency band.

The transmitting apparatus of the first aspect of the present technology may be an independent apparatus, or may be an internal block configuring one apparatus. In addition, a data processing method of the first aspect of the present technology is a data processing method corresponding to the transmitting apparatus of the first aspect of the present technology described above.

In the transmitting apparatus and the data processing method of the first aspect of the present disclosure, the physical layer signaling including the first identification information with which the group of the frequency bands constituting the channel bonding is identified, and the second identification information with which the frequency band belonging to the group is identified is generated. The broadcasting signal which includes the physical layer signaling, and which is changed in frequency band thereof by the relay apparatus is transmitted by utilizing a predetermined frequency band.

A receiving apparatus of a second aspect of the present technology is a receiving apparatus receiving a broadcasting signal which is transmitted from a transmitting apparatus and which is changed in frequency band thereof by a relay apparatus, in which the receiving section processes physical layer signaling which is included in the broadcasting signal and which includes first identification information with which a group of frequency bands constituting channel bonding is identified, and second identification information with which the frequency band belonging to the group is identified.

The receiving apparatus of the second aspect of the present technology may be an independent apparatus, or may be an internal block configuring one apparatus. In addition, a data processing method of the second aspect of the present technology is a data processing method corresponding to the receiving apparatus of the second aspect of the present technology described above.

In the receiving apparatus and the data processing method of the second aspect of the present technology, a broadcasting signal which is transmitted from a transmitting apparatus and which is changed in frequency band thereof by a relay apparatus is received. Physical layer signaling which is included in the broadcasting signal and which includes first identification information with which a group of frequency bands constituting channel bonding is identified and second identification information with which the frequency band belonging to the group is identified is processed.

Advantageous Effects of Invention

According to the first aspect and the second aspect of the present technology, the channel bonding can be more reliably performed.

It should be noted that the effect described herein is not necessarily limited, and any of effects described in the present disclosure may also be obtained.

BRIEF DESCRIPTION OF DRAWINGS

FIG. 2 is a diagram depicting an example of syntax of current L1D signaling.

FIG. 5 is a diagram depicting a first example of syntax of L1D signaling to which the present technology is applied.

FIG. 6 is a diagram depicting a second example of the syntax of the L1D signaling to which the present technology is applied.

FIG. 7 is a diagram depicting an example of channel bonding at a PLP level.

FIG. 8 is a diagram depicting an example in the case where the signaling of the channel bonding is performed in an upper layer.

DESCRIPTION OF EMBODIMENTS

Hereinafter, embodiments of the present technology will be described with reference drawings. It should be noted that the description will be given in accordance with the following order.

1. Channel Bonding of the Present Technology
2. Example of Signaling
3. Example of Signaling in Upper Layer
4. Example of Processing on Transmitting Side and Recording Side
5. Modifications
6. Configuration of Computer <1. Channel Bonding of Present Technology>
(Current Channel Bonding)

Figure 1:
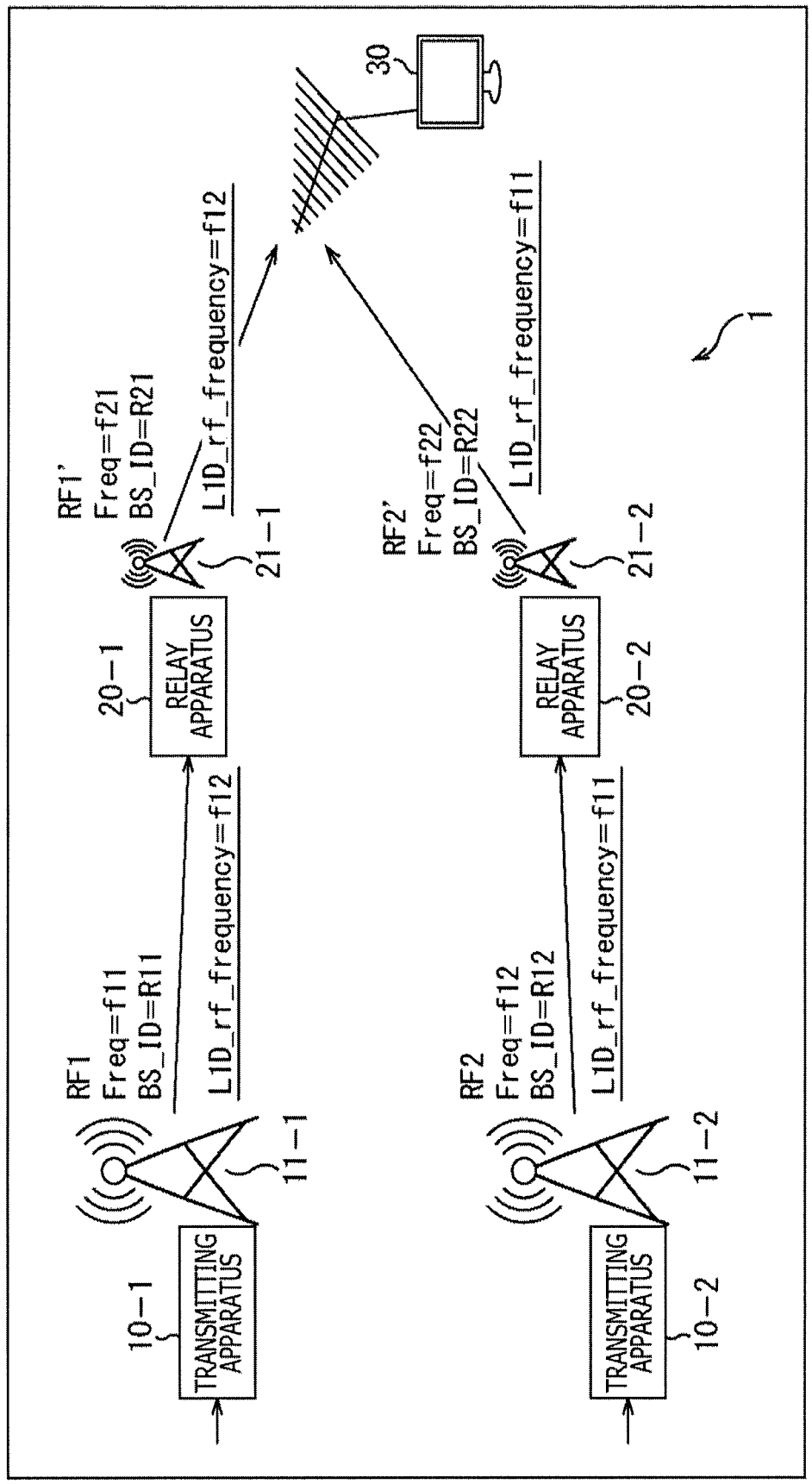
FIG. 1 is a diagram explaining channel bonding using signaling complying with the current standard.

First, a description is given with respect to channel bonding using signaling complying with the current standard with reference to FIG. 1.

In FIG. 1, a broadcasting system 1 includes transmitting apparatuses 10-1 and 10-2 installed in transmitting stations 11-1 and 11-2, respectively, relay apparatuses 20-1 and 20-2 installed in relay stations 21-1 and 21-2, respectively, and a receiving apparatus 30 installed within a home.

The transmitting apparatus 10-1 transmits a broadcasting signal via an antenna for transmission installed in the transmitting station 11-1. For example, the transmitting apparatus 10-1 executes processing such as modulation or error correction for data associated with contents (e.g., a broadcasting program or the like) transmitted from a data processing apparatus (not depicted) on a broadcasting station, and transmits the resulting broadcasting signal via the antenna for transmission in the transmitting station 11-1.

The relay apparatus 20-1 installed in the relay station 21-1 executes processing such as signal amplification, waveform equalization and the like for the broadcasting signal from the transmitting station 11-1. The broadcasting signal processed by the relay apparatus 20-1 is relayed via an antenna for relay installed in the relay station 21-1, and received by the receiving apparatus 30 such as a television receiver via an antenna for reception installed in each of homes or the like of end users.

The transmitting apparatus 10-2, similarly to the case of the transmitting apparatus 10-1, processes the data associated with the contents of the broadcasting program or the like and transmits the resulting broadcasting signal via the antenna for transmission of the transmitting station 11-2.

The relay apparatus 20-2, similarly to the case of the relay apparatus 20-1, processes the broadcasting signal from the transmitting station 11-2 and relays the resulting broadcasting signal by the antenna for relay in the relay station 21-2. The broadcasting signal from the relay station 21-2 is received by the receiving apparatus 30 installed in each of the homes or the like of the end users.

Here, there is supposed the case where the transmission of the broadcasting signal utilizing the channel bonding is performed by the transmitting apparatus 10-1 and the transmitting apparatus 10-2.

In this case, for example, a broadcasting signal (RF1) including a first division stream, and a broadcasting signal (RF2) including a second division stream can be sent by utilizing a frequency band of 12 MHz (6 MHz×2) in total obtained by bonding the different two channels (RF channels) each having a bandwidth of 6 MHz. In this case, the first stream and the second stream are obtained by the division from one stream. It should be noted that, although, for the sake of convenience of the description, the division stream is described herein as an example, various streams can be transmitted by utilizing the channel bonding.

For example, in the broadcasting signal (RF1) transmitted by the transmitting apparatus 10-1, a central frequency thereof is set to Freq=f11, and a broadcasting stream ID is set to BS_ID=R11. On the other hand, in the broadcasting signal (RF2) transmitted by the transmitting apparatus 10-2, a central frequency thereof is set to Freq=f12, and a broadcasting stream ID is set to BS_ID=R12.

In addition, in the relay station 21-1 and the relay station 21-2, a frequency band different from the frequency band in the transmitting station 11-1 and the transmitting station 11-2 becoming master stations thereof is normally used. In other words, in the broadcasting system 1, the transmitting apparatus 10-1, the transmitting apparatus 10-2, the relay apparatus 20-1, and the relay apparatus 20-2 configure a multi frequency networks (MFN).

For this reason, in a broadcasting signal (RF1') transmitted by the relay apparatus 20-1, a central frequency thereof is set to Freq=f21, and a broadcasting stream ID is set to BS_IDF=R21. On the other hand, in a broadcasting signal (RF2') transmitted by the relay apparatus 20-2, a central frequency thereof is set to Freq=f22, and a broadcasting stream ID is set to BS_ID=R22.

Meanwhile, in the current standard in which the channel bonding is prescribed, as the signaling of the physical layer thereof, information for realizing the channel bonding is arranged. For example, in case of ATSC3.0, information associated with the channel bonding is arranged in L1D signaling (L1-Detail Signaling) constituting the physical layer signaling.

Here, FIG. 2 depicts an example of syntax of the L1D signaling.

However, of the L1D signaling, a portion especially associated with the present technology is excerpted and described in the syntax of FIG. 2. Incidentally, "Table 9.8 L1_Detail Signaling Fields and Syntax" of NPL 1 described above describes the detailed contents of the L1D signaling.

L1D_version of 4 bits represents the version of the L1D signaling.

L1D_num_rf of 3 bits represents the number of frequency bands constituting the channel bonding. It becomes possible to discriminate whether or not the channel bonding is performed on the basis of L1D_num_rf. L1D_rf_frequency is arranged within the loop corresponding to L1D_num_rf.

L1D_rf_frequency of 19 bits represents a central frequency of the RF channel bonded by the channel bonding. Incidentally, this central frequency is set as a central frequency of other channel other than the target RF channel. In the case where a plurality of other RF channels is present, a plurality of L1D_rf_frequency corresponding to the plurality of other RF channels is arranged.

Returning back to the description of FIG. 1, for example, L1D_rf_frequency=f12 is arranged as a central frequency of other RF channel in the L1D signaling included in the broadcasting signal (RF1). With respect to this central frequency, there is specified the central frequency of the broadcasting signal (RF2), that is, the central frequency of the RF channel of other end (the side of the transmitting station 11-2) bonded by the channel bonding.

In addition, for example, L1D_rf_frequency=f11 is arranged as the central frequency of other RF channel in the L1D signaling included in the broadcasting signal (RF2), and there is specified the central frequency (the central frequency of the broadcasting signal (RF1)) of the RF channel of other end (the side of the transmitting station 11-1) bonded by the channel bonding.

At this time, the relay station 21-1 uses the frequency band different from that of the transmitting station 11-1 as the master station, and the relay station 21-2 uses the frequency band different from that of the transmitting station 11-2 as the master station. However, since the contents of the L1D signaling are not updated, the central frequency indicated by L1D_rf_frequency does not become one corresponding to the relay station 21-1 and the relay station 21-2.

More specifically, L1D_rf_frequency=f12 is arranged as the central frequency of other RF channel in the L1D signaling included in the broadcasting signal (RF1'). However, this central frequency is a central frequency (Freq=f12) of the RF channel of the transmitting station 11-2, but is not a central frequency (Freq=f22) of the RF channel of the relay station 21-2.

Similarly, in addition, L1D_rf_frequency=f11 is arranged as the central frequency of other RF channel in the L1D signaling included in the broadcasting signal (RF2'). However, this central frequency is a central frequency (Freq=f11) of the RF channel of the transmitting station 11-1, but is not a central frequency (Freq=f21) of the RF channel of the relay station 21-1.

Although in the current standard, the frequency band of the RF channel is changed in each of the relay apparatus 20-1 of the relay station 21-1, and the relay apparatus 20-2 of the relay station 21-2, the contents of the L1D signaling are not updated. Therefore, the mismatch is generated between the frequency band being used (new frequency band), and the central frequency indicated by L1D_rf_frequency of the L1D signaling (old frequency band).

For this reason, even when the receiving apparatus 30 processes the signaling of the physical layer (L1D signaling) included either in the broadcasting signal (RF1') or in the broadcasting signal (RF2'), it may be impossible to detect the signal constituting the channel bonding. In a word, for example, it may be impossible for the receiving apparatus 30 to reconstitute (restore) the original stream from the first division stream included in the broadcasting signal (RF1'), and the second division stream included in the broadcasting signal (RF2').

Then, in the present technology, in the signaling (L1D signaling) of the physical layer, instead of arranging the frequency information associated with the channel bonding, the identification information of the group constituting the channel bonding, and the identification information of the frequency band belonging to that group are caused to be arranged.

As a result, even in the case where the frequency band is changed via the relay station 21, the receiving apparatus 30 side can detect the signal constituting the channel bonding, and can more reliably perform the channel bonding.

Hereinafter, the contents of the present technology will be described on the basis of a concrete embodiment.

(Channel Bonding of Present Technology)

Figure 3:
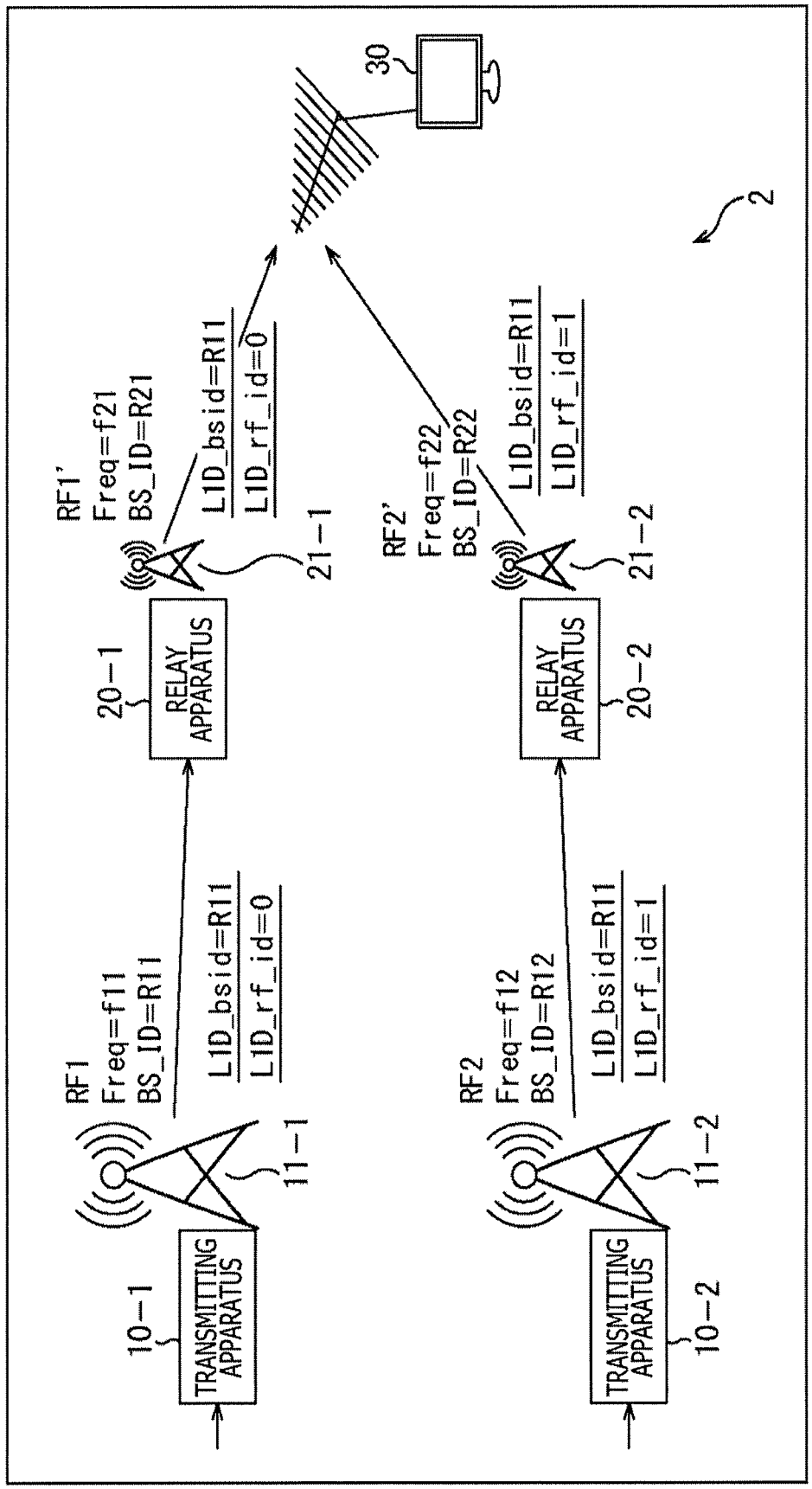
FIG. 3 is a diagram explaining channel bonding using signaling to which the present technology is applied.

FIG. 3 is a diagram explaining the channel bonding using the signaling to which the present technology is applied.

A broadcasting system 2 of FIG. 3, similarly to the case of the broadcasting system 1 of FIG. 1, includes the transmitting apparatuses 10-1 and 10-2 installed in the transmitting stations 11-1 and 11-2, respectively, the relay apparatuses 20-1 and 20-2 installed in the relay stations 21-1 and 21-2, respectively, and the receiving apparatus 30 installed within the home.

It should be noted that the receiving apparatus 30 is configured as a fixed receiving apparatus such as a television receiver, a set top box (STB), a personal computer or a game machine, or a mobile receiving apparatus such as a smartphone, a mobile phone or a tablet type computer. Moreover, the receiving apparatus 30 may be a wearable computer such as a head mounted display (HMD).

Here, also in the broadcasting system 2 of FIG. 3, the transmitting apparatus 10-1 and the transmitting apparatus 10-2 perform the transmission of the broadcasting signal utilizing the channel bonding. For example, the broadcasting signal (RF1) including the first division stream, and the broadcasting signal (RF2) including the second division stream are sent by, for example, utilizing the frequency band of 12 MHz in total obtained by bonding different two RF channels each having the band width of 6 MHz. In this case as well, one stream is divided into the first division stream and the second division stream.

It should be noted that, when the channel bonding is performed, for example, the different frequency bands such as a very high frequency (VHF) and an ultra high frequency (UHF) are combined with each other, thereby enabling the more robust transmission to be performed.

Then, since the broadcasting system 2 is configured as the multi frequency networks (MFN), the broadcasting signal (RF1) sent from the transmitting apparatus 10-1 is changed in central frequency (Freq) thereof from f11 to f21 by the relay apparatus 20-1 and the resulting signal is sent as the broadcasting signal (RF1'). In addition, the broadcasting signal (RF2) sent from the transmitting apparatus 10-2 is changed in central frequency (Freq) thereof from f12 to f22 by the relay apparatus 20-2 and the resulting signal is sent as the broadcasting signal (RF2').

For this reason, it is as previously stated that in the current standard, the mismatch is generated between the frequency band being used (Freq=f21 and f22) after the change, and the central frequency band (Freq=f11 and f12), before the change, indicated by L1D_rf_frequency of the L1D signaling.

Here, in the present technology, in order to solve such mismatch, in the L1D signaling, instead of arranging L1D_rf_frequency, L1D_bside and L1D_rf_id are arranged.

The broadcasting stream ID (BS_ID) is specified as information for identifying the group constituting the channel bonding to L1D_bsid.

The broadcasting stream ID is an identifier allocated to the physical layer band of the broadcasting, and is a unique value which is issued by Institutions of countries such as Federal Communications Commission (FCC) of USA and Ministry of Internal Affairs and Communications of Japan.

As the information for identifying the frequency band belonging to the group constituting the channel bonding identified with L1D_bsid, a value (e.g., 0, 1, 2, . . . ) becoming unique within the group of interest is specified to L1D_rf_id. By specifying the unique value to L1D_rf_id, it becomes possible to discriminate whether or not in front and behind the relay apparatuses 20-1 and 20-2, the broadcasting signals are identical to each other.

For example, L1D_bsid=R11 is arranged in the L1D signaling included in the broadcasting signal (RF1), and of the frequency bands constituting the channel bonding, the broadcasting stream ID in the lowest frequency band (the first frequency band (RF1)) within the group is specified.

In addition, L1D_rf_id=0 is arranged in the L1D signaling of the broadcasting signal (RF1), and ID for identifying the target frequency band (RF1) of the frequency bands constituting the channel bonding is specified.

Likewise, for example, L1D_bsid=R11 is arranged in the L1D signaling included in the broadcasting signal (RF2), and the broadcasting stream ID in the lowest frequency band (RF1) of the frequency bands constituting the channel bonding is specified. In addition, L1D_rf_id=1 is arranged in the L1D signaling included in the broadcasting signal (RF2), and the broadcasting stream ID for identifying the target frequency band (RF2) of the frequency bands constituting the channel bonding is specified.

In such a manner, in the L1D signaling which is transmitted with the broadcasting signals (RF1 and RF2) each becoming the target of the channel bonding, the common broadcasting stream ID (in this example, BS_ID of the lowest frequency band (RF1)) is specified as the identification information of the group constituting the channel bonding of interest.

In addition, in this L1D signaling, the unique value (in this example, 0 and 1) is specified as the identification information of the frequency band belonging to the group constituting the channel bonding of interest.

Then, by arranging L1D_bsid and L1D_rf_id in the L1D signaling, it is possible to solve the mismatch between the frequency band being used (Freq=f21 and f22) after the change, and the central frequency band (Freq=f11 and f12) before the change, indicated by L1D_rf_frequency of the L1D signaling, due to the change of the frequency band in the relay apparatuses 20-1 and 20-2, which is generated in the current standard.

For example, L1D_bsid=R11 and L1D_rf_id=0 are arranged in the L1D signaling included in the broadcasting signal (RF1), and L1D_bsid=R11 and L1D_rf_id=1 are arranged in the L1D signaling included in the broadcasting signal (RF2).

Since the common broadcasting stream ID as R11 is included as L1D_bsid in both the pieces of L1D signaling, it is discriminated with the BS_ID that the broadcasting signal (RF1) and the broadcast signal (RF2) belong to the same group constituting the channel bonding. In addition, although 0 and 1 are specified as L1D_rf_id, the frequency band (broadcasting signal) belonging to the group constituting the channel bonding is identified with these unique values.

For this reason, in the case where the frequency of the RF channel is changed by the relay apparatus 20-1 and the relay apparatus 20-2, even when the contents of the L1D signaling are not updated, it becomes possible to identify the group (R11) constituting the channel bonding with L1D_bsid. In addition, the individual broadcasting signals (RF1 and RF2 or RF1' and RF2') within the group constituting the channel bonding can be identified with L1D_rf_id.

In other words, instead of including the frequency information (L1D_rf_frequency) of the channel bonding, L1D_bsid and L1D_rf_id are included in the L1D signaling of the present technology. Therefore, the group constituting the channel bonding, or the broadcasting signal belonging to that group can be identified irrespective of the change of the frequency band by the relay apparatuses 20-1 and 20-2.

Then, in the receiving apparatus 30, (L1D_bsid and L1D_rf_id of) the L1D signaling included either in the broadcasting signal (RF1') or in the broadcasting signal (RF2') is processed. As a result, the signals of the same group constituting the channel bonding are detected, so that, for example, the original stream can be reconstituted (restored) from the first division stream included in the broadcasting signal (RF1'), and the second division stream included in the broadcasting signal (RF2').

Figure 4:
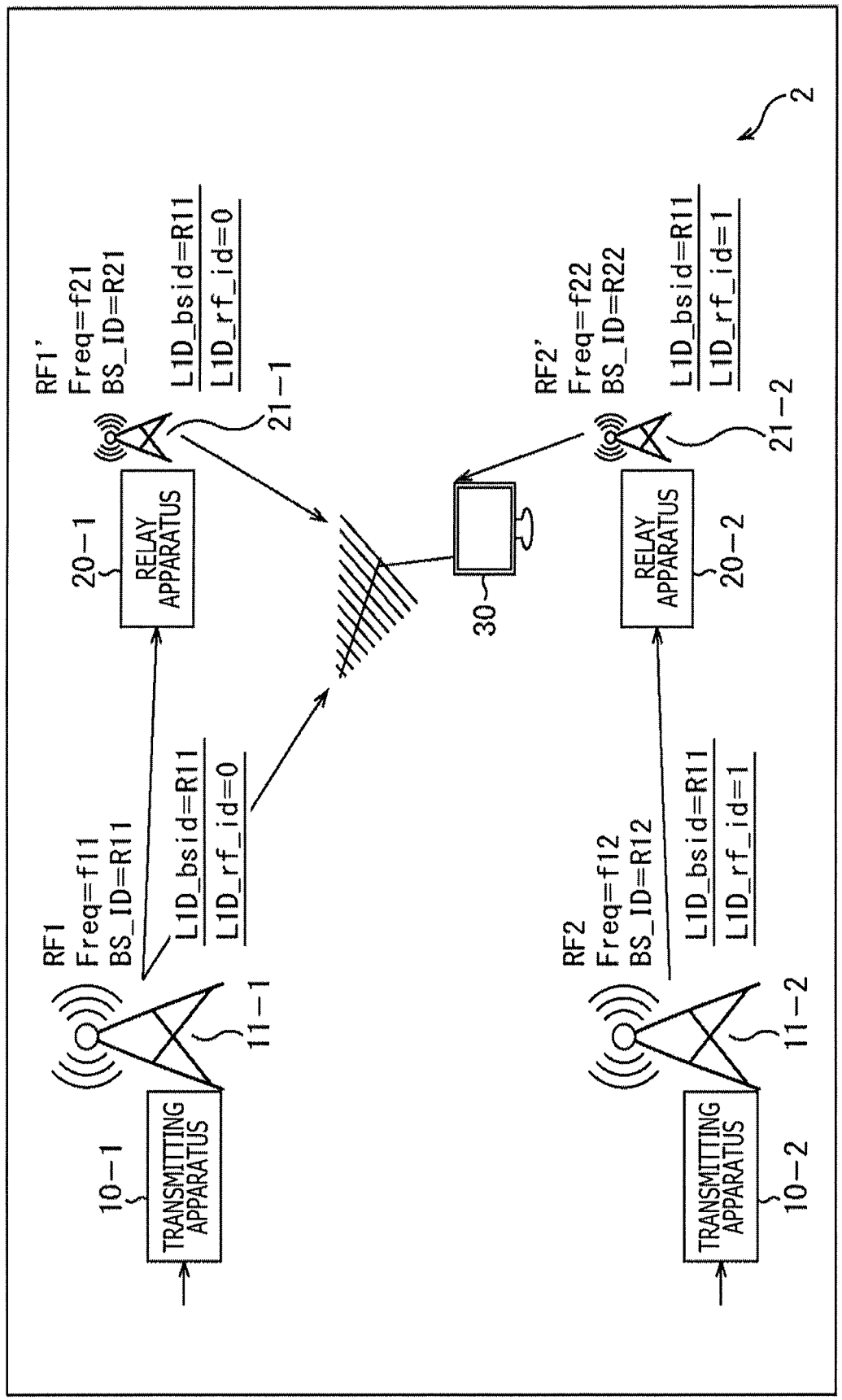
FIG. 4 is a diagram explaining the channel bonding using the signaling to which the present technology is applied.

Here, it is supposed that as depicted in FIG. 4, the receiving apparatus 30 receives the broadcasting signals in front and behind the relay apparatus 20-1, that is, both the pieces of broadcasting signal (RF1) from the transmitting apparatus 10-1, and the broadcasting signal (RF1') from the relay apparatus 20-1.

In this case, in the receiving apparatus 30, (L1D_bsid and L1D_rf_id of) the L1D signaling is processed, resulting in that, since L1D_bsid=R11 and L1D_rf_id=0 are both specified, it is possible to identify that the broadcasting signal (RF1) and the broadcasting signal (RF1') are the same broadcasting signal.

The receiving apparatus 30, for example, executes the processing using the standard such as a signal quality or a signal intensity at the time of the reception, thereby enabling one of the broadcasting signal (RF1) and the broadcasting signal (RF1') to be selected. Then, for example, the receiving apparatus 30 can re-constitute the original stream from the first division stream included in the selected broadcasting signal (RF1 or RF1'), and the second division stream included in the broadcasting signal (RF2') from the relay apparatus 20-2.

Incidentally, in the current standard described above (the L1D signal of FIG. 2), L1D_rf_id is indicated by the order of the list of the central frequencies constituting the channel bonding to become the implicit value. In the present technology, however, the unique value is specified to L1D_rf_id and is set as an explicit value, resulting in that the explicit value is used for the discrimination as to whether or not the broadcasting signals in front and behind the relay apparatus 20 are the same broadcasting signal to suppress the interference.

<2. Example of Signaling>

FIRST EXAMPLE

FIG. 5 is a diagram depicting a first example of the syntax of the L1D signaling to which the present technology is applied.

However, of the L1D signaling, only a portion corresponding to the L1D signaling complying with the current standard depicted in FIG. 2 is excerpted and described in the syntax of FIG. 5.

Similarly to the case of the L1D signaling of FIG. 2, L1D_version representing the version of the L1D signaling, and L1D_num_rf representing the number of frequency bands constituting the channel bonding are arranged in the L1D signaling of FIG. 5.

In the case where L1D_num_rf of 3 bits meets a condition of L1D_num_rf>0, that is, in the case where the channel bonding is performed, L1D_bsid and L1D_rf_id are arranged.

L1D_bsid of 16 bits represents the broadcasting stream ID (BS_ID) with which the group constituting the channel bonding is discriminated.

For example, the broadcasting stream ID (BS_ID) in the lowest frequency band (the first frequency band (RF1)), within the group, of the frequency bands constituting the channel bonding can be specified as the broadcast stream ID.

L1D_rf_id of 3 bits represents ID with which the frequency band belonging to the group constituting the channel bonding is identified. The unique value within the group of interest, for example, 0, 1, 2, . . . is specified as the ID in this frequency band.

In the example of the syntax of the L1D signaling of FIG. 5, the numbers of bits of L1D_bsid and L1D_rf_id which are arranged in the case where the condition of L1D_num_rf>0 is met are 16 bits and 3 bits, respectively, and are 19 bits in total. Therefore, 19 bits becomes the same number of bits of 19 bits of L1D_rf_frequency of the L1D signaling complying with the current standard.

In contrast, in the L1D signaling complying with the current standard, L1D_rf_frequency of 19 bits is arranged within the loop corresponding to L1D_num_rf. Therefore, in the case where the condition of L1D_num_rf>0 is met, the compatibility with the L1D signaling of the present technology in which L1D_bsid of 16 bits, and L1D_rf_id of 3 bits are arranged shall be lost. However, since the unnecessary information may not be included, an amount of information can be optimized.

In other words, since, in the L1D signaling of the present technology, only the minimum required information of L1D_bsid of 16 bits, and L1D_rf_id of 3 bits is transmitted, the amount of information of the L1D signaling can be optimized. As a result, the operation of the receiving apparatus 30 can be simplified.

It should be noted that, in FIG. 5, in the case where an unsigned integer most significant bit first (uimsbf) is specified as a format, this means that the bit calculation is performed for uimsbf and uimsbf is treated as an integer number.

SECOND EXAMPLE

FIG. 6 is a diagram depicting a second example of the syntax of the L1D signaling to which the present technology is applied.

However, of the L1D signaling, only a portion corresponding to the L1D signaling complying with the current standard depicted in FIG. 2 is excerpted and described in the syntax of FIG. 6.

Similarly to the case of the L1D signaling of FIG. 2, L1D_version representing the version of the L1D signaling, and L1D_num_rf representing the number of frequency bands constituting the channel bonding are arranged in the L1D signaling of FIG. 6.

L1D_bsid and L1D_rf_id are arranged in the loop corresponding to L1D_num_rf of 3 bits.

L1D_bsid of 16 bits represents the broadcasting stream ID (BS_ID) with which the group constituting the channel bonding is identified, and for example, the broadcasting stream ID (BS_ID) in the lowest frequency band within the group can be specified.

L1D_rf_id of 3 bits represents ID with which the frequency band belonging to the group constituting the channel bonding is identified. The unique value within the group of interest, for example, 0, 1, 2, . . . is specified as the ID in this frequency band.

In the example of the syntax of the L1D signaling of FIG. 6, the numbers of bits of L1D_bsid and L1D_rf_id which are arranged within the loop corresponding to L1D_num_rf are 16 bits and 3 bits, respectively, and are 19 bits in total. Therefore, 19 bits becomes the same number of bits of 19 bits of L1D_rf_frequency of the L1D signaling complying with the current standard.

Moreover, in the example of the syntax of the L1D signaling of FIG. 6, similarly to the case of the L1D signaling complying with the current standard, since L1D_bsid and L1D_rf_id of 19 bits in total are arranged within the loop corresponding to L1D_num_rf, the compatibility with the L1D signaling complying with the current standard can be secured. However, since in the example of the syntax of the L1D signaling of FIG. 6, the information within the loop in and after a second round is unnecessary, that information is secured as the prospective reservation (reserved).

<3. Example of Signaling in Upper Layer>

(CB at PLP Level)

FIG. 7 depicts an example of the channel bonding at a PLP level.

In FIG. 7, three RF channels (frequency bands) in which BS_ID=R11, R12, and R13 are respectively set as the broadcasting stream IDs are bonded to one another to perform the channel bonding.

In the L1D signaling included in the broadcasting signal of the first RF channel (BS_ID=R11), L1D_bsid=R11 and L1D_rf_id=0 are specified. In addition, in the first RF channel, three Physical Layer Pipes (PLPs) which are identified with PLP_ID=0, 1, and 2, respectively, are transmitted.

In the L1D signaling included in the broadcasting signal of the second RF channel (BS_ID=R12), L1D_bsid=R11, L1D_rf_id=1 are specified. In addition, in the second RF channel, similarly to the case of the first RF channel, three PLPs which are respectively identified with PLP_ID=0, 1, and 2 are transmitted.

In the L1D signaling included in the broadcasting signal of the third RF channel (BS_ID=R13), L1D_bsid=R11 and L1D_rf_id=2 are specified. In addition, in the third RF channel, similarly to the case of the first RF channel, three PLPs which are respectively identified with PLP_ID=0, 1, and 2 are transmitted.

In other words, although three RF channels (BS_ID=R11, R12, and R13) are bonded to one another to perform the channel bonding, the same L1D_bsid (R11: BS_ID allocated to the RF channel in the lowest frequency band) is specified in the L1D signaling of the channels, thereby identifying that three RF channels belong to the group of the same channel bonding.

In addition, in the L1D signaling of the channels, different L1D_rf_id (0, 1, and 2: unique value) are specified, thereby identifying the RF channels (frequency bands) belonging to the group of the channel bonding.

Here, in PLP#0, the channel bonding at the PLP level is performed by utilizing PLP (PLP_ID=0) of the RF channel (BS_ID=R11), PLP (PLP_ID=0) of the RF channel (BS_ID=R12), and PLP (PLP_ID=0) of the RF channel (BS_ID=R13).

In addition, in PLP#1, the channel bonding at the PLP level is performed by utilizing PLP (PLP_ID=1) of the RF channel (BS_ID=R11) and PLP (PLP_ID=1) of the RF channel (BS_ID=R12). Moreover, in PLP#2, the channel bonding at the PLP level is performed by utilizing PLP (PLP_ID=2) of the RF channel (BS_ID=R11), and PLP (PLP_ID=2) of the RF channel (BS_ID=R13).

At this time, although the L1D signaling of the channels includes L1D_bsid and L1D_rf_id, these fields become the signaling at the frequency band level, so that these fields do not exert an influence on the operation in the channel bonding at the PLP level.

(Upper Layer Signaling Including Information of CS)

FIG. 8 is a diagram depicting an example in the case where the signaling of the channel bonding is performed in the upper layer.

In FIG. 8, similarly to the case of FIG. 7, the three RF channels (frequency bands) in which BS_ID=R11, R12, and R13 are respectively set are bonded to one another to perform the channel bonding.

Here, PLP#0 utilizes only PLP (PLP_ID=0) of the RF channel (BS_ID=R11), and the channel bonding at the PLP level is not performed.

In addition, in PLP#1, the channel bonding at the PLP level is performed by utilizing PLP (PLP_ID=1) of the RF channel (BS_ID=R11), and PLP (PLP_ID=1) of the RF channel (BS_ID=R12). Moreover, in PLP#2, the channel bonding at the PLP level is performed by utilizing PLP (PLP_ID=2) of the RF channel (BS_ID=R11), and PLP (PLP_ID=2) of the RF channel (BS_ID=R13).

At this time, since PLP#0 becomes PLP which is ineligible for the channel bonding, in the receiving apparatus 30, described one of the broadcasting signals corresponding to BS_ID=R11 and PLP_ID=0 is selected, thereby enabling the upper layer signaling to be acquired from the stream obtained from the broadcasting signal of interest.

In the present technology, the information associated with the channel bonding is included in the upper layer signaling. For example, a list of the broadcasting stream IDs (BS_ID), information indicating the correspondence between the broadcasting stream ID and the frequency band as the frequency information for each region, and the like can be included as the information associated with the channel bonding.

In other words, in the physical layer signaling such as the L1D signaling, it is necessary to reduce the amount of information. However, since, in the upper layer signaling, more information can be included, various pieces of information can be included. Then, in the receiving apparatus 30, the information associated with the channel bonding included in the upper layer signaling is processed, thereby enabling the processing associated with the channel bonding in the physical layer to be executed.

It should be noted that the upper signaling is signaling in the upper layer which is higher than the physical layer. The broadcasting stream ID specified by a bsid attribute of a SLT (Service List Table) prescribed in ATSC3.0 can, for example, be included in the upper layer signaling. "6.3.1 SLT Syntax Description" of following NPL 2 describes details of the SLT.

[NPL 2]

ATSC Candidate Standard: Signaling, Delivery, Synchronization, and Error Production (A/331)

<4. Example of Processing on Transmitting Side and Receiving Side>

(Example of Configuration of Transmitting Apparatus)

Figure 9:
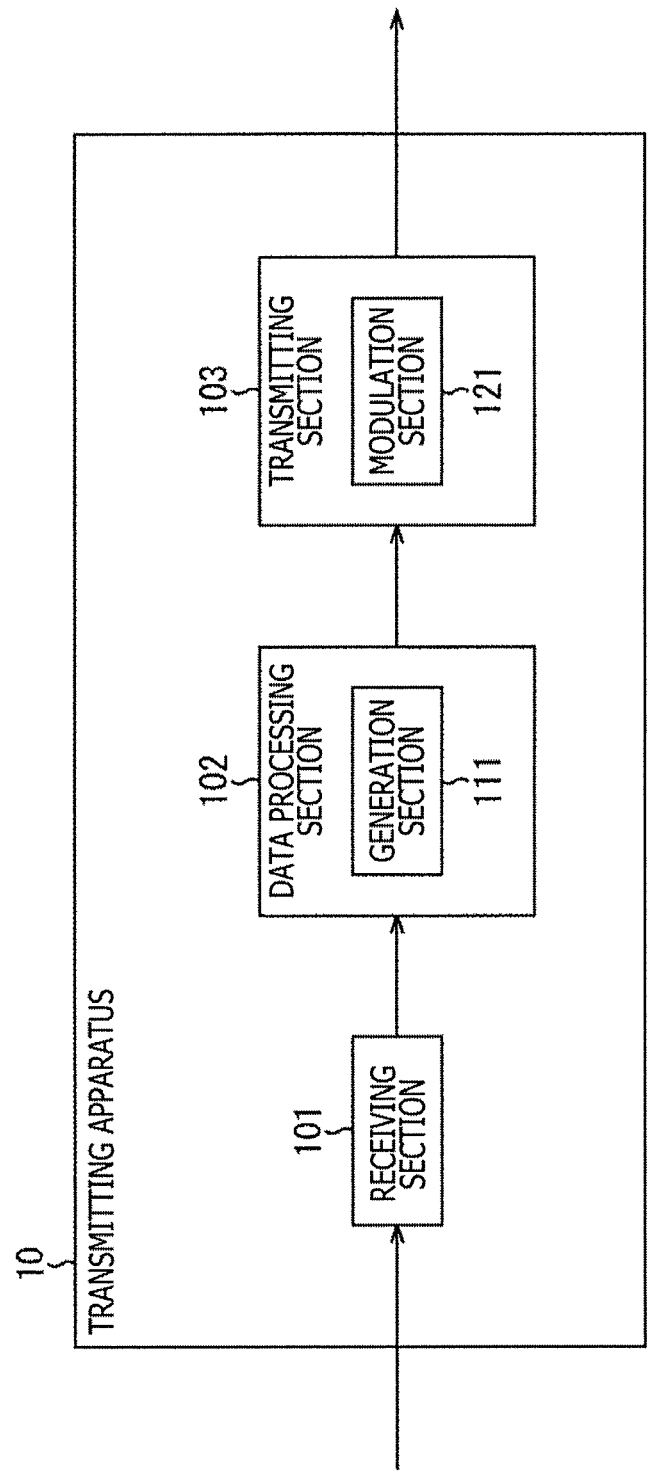
FIG. 9 is a block diagram depicting an example of a configuration of a transmitting apparatus.

FIG. 9 is a block diagram depicting an example of a configuration of the transmitting apparatus 10 (10-1 and 10-2) of FIG. 3 or FIG. 4.

In FIG. 9, the transmitting apparatus 10 includes a receiving section 101, a data processing section 102, and a transmitting section 103.

The receiving section 101, for example, is configured as a communication interface circuit or the like. The receiving section 101 receives data transmitted from a data processing apparatus (not depicted) on the broadcasting station side via a predetermined transmission line such as a communication line, and supplies the data to the data processing section 102.

It should be noted that, in the case where the channel bonding is performed, the data from the data processing apparatus (not depicted) on the broadcasting station side, for example, is set as data including the first division stream and the second division stream into which one stream is divided.

The data processing section 102, for example, is configured as a signal processing circuit or the like which processes various kinds of signals. The data processing section 102 processes the data supplied from the receiving section 101 to generate a physical layer frame complying with a predetermined broadcasting system (e.g., ATSC3.0 or the like), and supplies the resulting physical layer frame to the transmitting section 103.

In addition, the data processing section 102 includes a generation section 111. The generation section 111, when generating the physical layer frame, generates physical layer signaling which is to be arranged in a preamble of the physical layer frame. L1D signaling, for example, is generated as the physical layer signaling.

The transmitting section 103 includes a modulation section 121 as a modulator. The modulation section 121 executes necessary processing (e.g., OFDM (Orthogonal Frequency Division Multiplexing) modulation processing or the like) for the data supplied from the data processing section 102, and transmits the resulting broadcasting signal (RF1 or RF2) through an antenna for transmission of the transmitting station 11.

The transmitting apparatus 10 is configured in the manner as described above.

(Example of Configuration of Receiving Apparatus)

Figure 10:
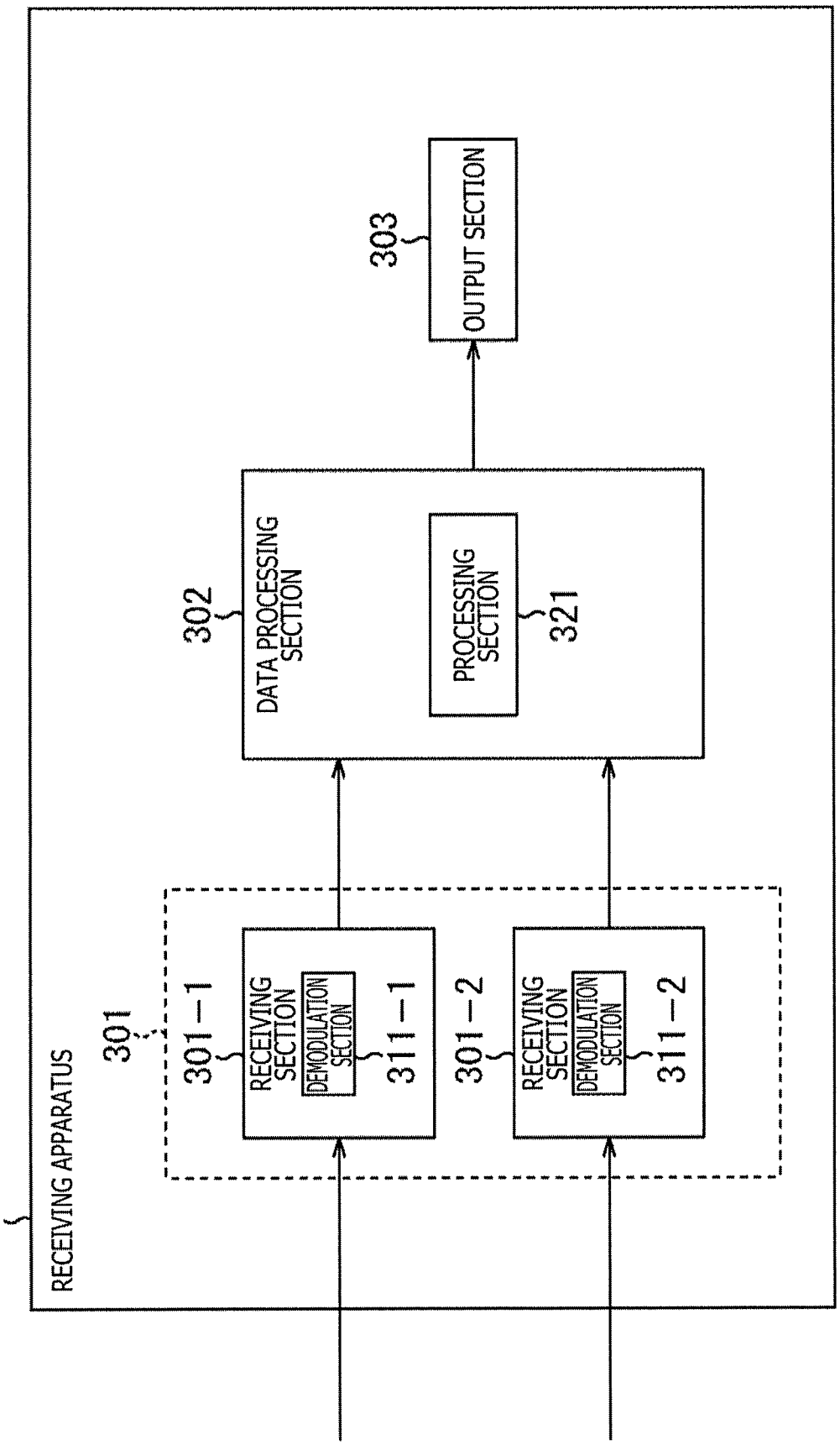
FIG. 10 is a block diagram depicting an example of a configuration of a receiving apparatus.

FIG. 10 is a block diagram depicting an example of a configuration of the receiving apparatus 30 of FIG. 3 or FIG. 4.

In FIG. 10, the receiving apparatus 30 includes a receiving section 301, a data processing section 302, and an output section 303. In addition, the receiving section 301 includes a receiving section 301-1 and a receiving section 301-2.

The receiving section 301-1, for example, is configured as a tuner, a demodulator or the like. The receiving section 301-1 processes necessary processing for the broadcasting signal (RF1') received through an antenna for reception, and supplies the resulting data to the data processing section 302. In addition, the receiving section 301-1 includes a demodulation section 311-1.

The demodulation section 311-1 is configured as a demodulator such as a demodulation LSI (Large Scale Integration). The demodulation section 311-1 executes demodulation processing such as OFDM demodulation processing for the received broadcasting signal (RF1'). For example, in the demodulation processing, the physical layer frame is processed on the basis of the L1D signaling, and the first division stream included in the broadcasting signal (RF1') is obtained.

The receiving section 301-2, for example, is configured as a tuner, a demodulator or the like. The receiving section 301-2 processes necessary processing for the broadcasting signal (RF2') received through the antenna for reception, and supplies the resulting data to the data processing section 302. In addition, the receiving section 301-2 includes a demodulation section 311-2.

The demodulation section 311-2 is configured as a demodulator such as a demodulation LSI, and executes a demodulation processing such as OFDM demodulation processing for the received broadcasting signal (RF2'). For example, in the demodulation processing, the physical layer frame is processed on the basis of the L1D signaling, and the second division stream included in the broadcasting signal (RF2') is obtained.

The data processing section 302, for example, is configured as a system on chip (SoC) or the like. The data processing section 302 executes various kinds of signal processing for data supplied from the receiving section 301-1 and the receiving section 301-2, and supplies the resulting data to the output section 303.

It should be noted that in this case, for example, the demodulation processing, the reproduction processing, and the like are executed on the basis of the upper layer signaling.

In addition, the data processing section 302 includes a processing section 321. The processing section 321, for example, synthesizes the first division stream from the demodulation section 311-1 of the receiving section 301-1, and the second division stream from the demodulation section 311-2 of the receiving section 301-2 with each other to reconstitute (restore) the original stream.

The output section 303, for example, includes a speaker, a display device (e.g., an LCD, an OLED) or the like). The output section 303 outputs a video or a sound of contents such as a broadcasting program on the basis of the data from the data processing section 302.

Incidentally, in the configuration of FIG. 10, for the sake of simplicity of the description, there is exemplified the configuration in which two receiving sections: the receiving section 301-1 and the receiving section 301-2 are provided so as to correspond to the configuration of FIG. 3 or FIG. 4. However, the receiving section 301 is provided depending on the number of RF channels which are to be bonded in the channel bonding.

The receiving apparatus 30 is configured in the manner as described above.

(Flow of Processing on Transmitting Side and Receiving Side)

Figure 11:
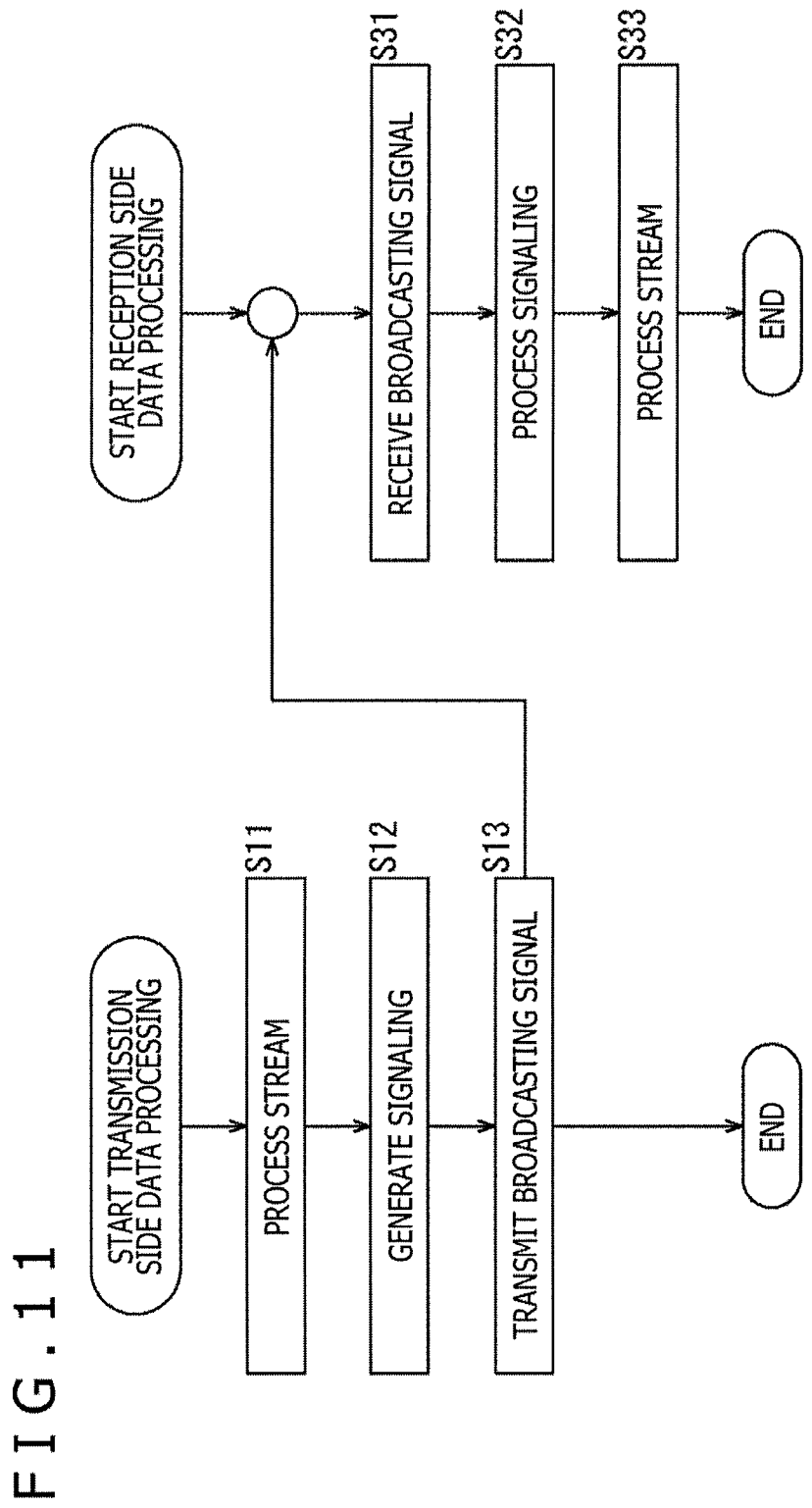
FIG. 11 is a flow chart explaining a flow of data processing between a transmitting side and a receiving side.

Next, a description will be given with respect to a flow of data processing on the transmitting side and the receiving side with reference to a flow chart of FIG. 11.

It should be noted that although the data processing on the transmitting side becomes processing which is to be executed by the transmitting apparatus 10-1 and the transmitting apparatus 10-2 of FIG. 3 or FIG. 4, in this case, a description is given with a focus on the processing which is to be executed by the transmitting apparatus 10-1. In addition, the data processing on the receiving side is processing which is to be executed by the receiving apparatus 30 of FIG. 3 or FIG. 4.

First, in the transmitting apparatus 10-1, processing of following Steps S11 to S13 is executed.

In Step S11, the data processing section 102 processes the first division stream obtained through the division of one stream.

In Step S12, the generation section 111 of the data processing section 102 generates the L1D signaling. For example, L1D_bsid=R11 and L1D_rf_id=0 are specified as the L1D signaling.

In Step S13, the transmitting section 103 transmits the broadcasting signal (RF1) including the first division stream processed in the processing of Step S11, and the L1D signaling generated in the processing of Step S12 through the antenna for transmission of the transmitting station 11-1.

Incidentally, in the transmitting apparatus 10-2 as well, the processing similar to that of the transmitting apparatus 10-1 is executed, and the broadcasting signal (RF2) including the second division stream and the L1D signaling (L1D_bsid=R11, L1D_rf_id=1) is transmitted through the antenna for transmission of the transmitting station 11-2.

In addition, the broadcasting signal (RF1) transmitted by the transmitting apparatus 10-1 is processed by the relay apparatus 20-1 of the relay station 21-1 to be transmitted as the broadcasting signal (RF1'). Meanwhile, the broadcasting signal (RF2) transmitted by the transmitting apparatus 10-2 is processed by the relay apparatus 20-2 of the relay station 21-2 to be transmitted as the broadcasting signal (RF2').

Next, in the receiving apparatus 30, processing of following Steps S31 to S33 is executed.

In Step S31, the receiving section 301-1 receives the broadcasting signal (RF1') transmitted from the relay apparatus 20-1. In addition, in Step S31, the receiving section 301-2 receives the broadcasting signal (RF2') transmitted from the relay apparatus 20-2.

In Step S32, the demodulation section 311-1 of the receiving section 301-1 processes the L1D signaling included in the physical layer frame obtained from the broadcasting signal (RF1'). In addition, the demodulation section 311-2 of the receiving section 301-2 processes the L1D signaling included in the physical layer frame obtained from the broadcasting signal (RF2').

Here, L1D_bsid=R11 and L1D_rf_id=0 are specified to the L1D signaling obtained from the broadcasting signal (RF1'), and L1D_bsid=R11 and L1D_rf_id=1 are specified to the L1D signaling obtained from the broadcasting signal (RF2'). For this reason, in the receiving apparatus 30, even in the case where the frequency band is changed via the relay apparatuses 20-1 and 20-2, it becomes possible to detect the signals constituting the channel bonding.

In Step S33, the stream is processed on the basis of the L1D signaling processed in the processing of Step S32.

In this case, the physical layer frame is processed by the demodulation section 311-1 of the receiving section 301-1 to obtain the first division stream included in the broadcasting signal (RF1'). In addition, the physical layer frame is processed by the demodulation section 311-2 of the receiving section 301-2 to obtain the second division stream included in the broadcasting signal (RF2').

Then, the processing section 321 of the data processing section 302 synthesizes the first division stream and the second division stream with each other to reconstitute (restore) the original stream. As a result, in the output section 303, the video or sound of the contents such as the broadcasting program is outputted.

The data processing on the transmission side and the reception side has been described so far.

<5. Modifications>

(Application to Other Standards)

In the above description, the ATSC (particularly, ATSC3.0) as the system adopted in United States and the like have been described as the standard of the digital broadcasting. However, the present technology may be applied to ISDB (Integrated Services Digital Broadcasting) as the system which Japan and the like adopt, or DVB (Digital Video Broadcasting) as the system which countries or the like of Europe adopt. In addition, although in the above description, the description has been given with ATSC3.0 adopting the IP transmission system as an example, for example, the present technology may also be applied to other system such as an MPEG-TS (Transport Stream) system in addition to the IP transmission system.

In addition, as far as the standard of the digital broadcasting, the present technology can be applied to the standard of the satellite broadcast utilizing a broadcasting satellite (BS), a communication satellite (CS) or the like, cable broadcasting such as a cable television (CATV), and the like in addition to the terrestrial broadcasting.

(Other Example of Channel Bonding)

It should be noted that, although the case where the number of RF channels bonded to each other by the channel bonding is two has been exemplified in the above description for the sake of simplicity of the description, three or more RF channels may be bonded to one another by the channel bonding. In addition, as described above, the stream which is transmitted by utilizing the channel bonding is not limited to the division stream obtained through the division of one stream, and various streams can be transmitted as long as the stream can be processed on the side of the receiving apparatus 30.

(Other Name of Signaling or Field)

In addition, the names of the signaling and its field are merely an example, and other names are used in some cases. However, a difference between these names is a formal difference, and thus the substantial contents of the target signaling or field do not differ. For example, the L1D signaling is the physical layer signaling, and adopts other name in some cases. In addition, other names may also be used for L1D_bsid or L1D_rf_id.

In addition, the present technology can also be applied to the predetermined standard (the standard other than the standard of the digital broadcasting) prescribed on the assumption that a transmission line other than a broadcasting network, that is, for example, a communication line (communication network) or the like such as the Internet or a telephone network is utilized as a transmission line. In this case, the communication line such as the Internet or the telephone network is utilized as the transmission line of the broadcasting system 2 (FIG. 3 or FIG. 4), and the transmitting apparatus 10 can be made a server provided on the Internet. Then, the communication server of interest, and the receiving apparatus 30 perform the bidirectional communication via the transmission line such as the communication line.

<6. Configuration of Computer>

Figure 12:
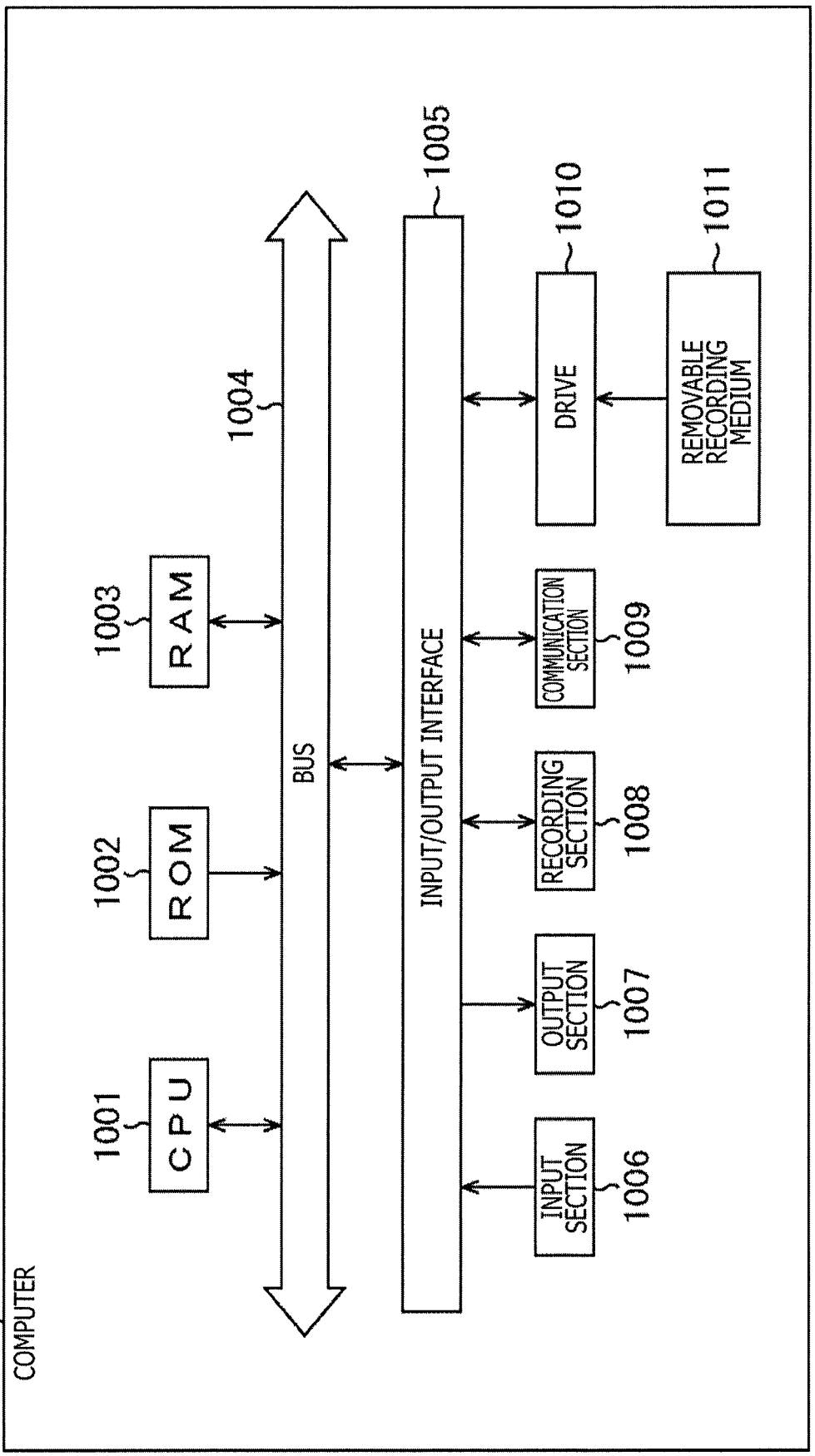
FIG. 12 is a block diagram depicting an example of a configuration of a computer.

The series of processing described above can be executed by hardware, or can be executed by software. In the case where the series of processing are executed by the software, a program constituting the software is installed in a computer. FIG. 12 is a block diagram depicting an example of a configuration of hardware of a computer which executes the series of processing described above in accordance with a program.

In a computer 1000, a CPU (Central Processing Unit) 1001, a ROM (Read Only Memory) 1002, a RAM (Random Access Memory) 1003 are connected to one another through a bus 1004. An input/output interface 1005 is further connected to the bus 1004. An input section 1006, an output section 1007, a recording section 1008, a communication section 1009, and a drive 1010 are connected to the input/output interface 1005.

The input section 1006 includes a keyboard, a mouse, a microphone, or the like. The output section 1007 includes a display, a speaker, or the like. The recording section 1008 includes a hard disc, a non-volatile memory, or the like. The communication section 1009 includes a network interface or the like. The drive 1010 drives a removable recording medium 1011 such as a magnetic disc, an optical disc, a magneto-optical disc or a semiconductor memory.

In the computer 1000 configured in the manner as described above, the CPU 1001 loads a program recorded in the ROM 1002 or the recording section 1008 into the RAM 1003 via the input/output interface 1005 and the bus 1004, and executes the program, thereby executing the series of processing described above.

The program which is to be executed by the computer 1000 (CPU 1001), for example, can be recorded in the removable recording medium 1011 as a package medium or the like to be provided. In addition, the program can be provided via a wired or a wireless transmission medium such as a local area network, the Internet, or digital satellite broadcasting.

In the computer 1000, the drive 1010 is equipped with the removable recording medium 1011, thereby enabling the program to be installed in the recording section 1008 via the input/output interface 1005. In addition, the program can be received at the communication section 1009 via the wired or the wireless transmission medium and can be installed in the recording section 1008. In addition thereto, the program can be previously installed in the ROM 1002 or the recording section 1008.

Here, in this description, the processing which the computer executes in accordance with the program is not necessarily executed in time series along the order described in the form of the flow chart. More specifically, the processing which the computer executes in accordance with the program also includes the processing which is executed in parallel or individually (e.g., the parallel processing or the processing by the object). In addition, the program may become one which is processed by one computer (processor), or may be one which is dispersedly processed by a plurality of computers.

It should be noted that the embodiments of the present technology are by no means limited to the embodiments described above, and various changes can be made without departing from the subject matter of the present technology.

In addition, the present technology can adopt the following constitutions.

(1)

A transmitting apparatus including:

a generation section generating physical layer signaling including first identification information with which a group of frequency bands constituting channel bonding is identified, and second identification information with which a frequency band belonging to the group is identified; and a transmitting section transmitting a broadcasting signal which includes the physical layer signaling and is changed in frequency band thereof by a relay apparatus by utilizing a predetermined frequency band.

(2)

The transmitting apparatus according to (1) described above, in which the first identification information is an identifier allocated to a frequency band of a physical layer, and the second identification information is an identifier which is a unique value within the group and is allocated to a frequency band utilized at the time of transmission.

(3)

The transmitting apparatus according to (2) described above, in which the first identification information is an identifier which is common within the group and is allocated to any one of frequency bands of the physical layer within the group.

(4)

The transmitting apparatus according to (2) or (3) described above, in which the physical layer signaling includes only one set of the first identification information and the second identification information.

(5)

The transmitting apparatus according to (2) or (3) described above, in which the physical layer signaling includes a prospective reserved region together with a set of the first identification information and the second identification information within a loop corresponding to the number of frequency bands belonging to the group.

(6)

The transmitting apparatus according to any one of (1) to (5) described above, in which the channel bonding is performed at a PLP (Physical Layer Pipe) level.

(7)

The transmitting apparatus according to (6) described above, in which information associated with the channel bonding is included as signaling of an upper layer higher than the physical layer in the PLP ineligible for the channel bonding.

(8)

The transmitting apparatus according to any one of (1) to (7) described above, in which the broadcasting signal includes a division stream obtained through division of one stream together with the physical layer signaling.

(9)

The transmitting apparatus according to any one of (1) to (8) described above, in which the transmitting apparatus is installed in a transmitting station, the relay apparatus is installed in a relay station, and the transmitting apparatus and the relay apparatus constitute multi frequency networks (MFN).

(10)

A data processing method of a transmitting apparatus including the steps of:

by the transmitting apparatus, generating physical layer signaling including first identification information with which a group of frequency bands constituting channel bonding is identified, and second identification information with which the frequency bands belonging to the group are identified; and transmitting a broadcasting signal which includes the physical layer signaling and is changed in frequency band thereof by a relay apparatus by utilizing a predetermined frequency band.

(11)

A receiving apparatus including:

a receiving section receiving a broadcasting signal which is transmitted from a transmitting apparatus and which is changed in frequency band thereof by a relay apparatus, in which the receiving section processes physical layer signaling which is included in the broadcasting signal and which includes first identification information with which a group of frequency bands constituting channel bonding is identified, and second identification information with which the frequency band belonging to the group is identified.

(12)

The receiving apparatus according to (11) described above, in which the first identification information is an identifier allocated to a frequency band of a physical layer, and the second identification information is an identifier which is a unique value within the group and is allocated to a frequency band utilized at the time of transmission.

(13)

The receiving apparatus according to (12) described above, in which the first identification information is an identifier which is common within the group and is allocated to any one of frequency bands of the physical layer within the group.

(14)

The receiving apparatus according to (12) or (13) described above, in which the physical layer signaling includes only one set of the first identification information and the second identification information.

(15)

The receiving apparatus according to (12) or (13) described above, in which the physical layer signaling includes a prospective reserved region together with a set of the first identification information and the second identification information within a loop corresponding to the number of frequency bands belonging to the group.

(16)

The receiving apparatus according to any one of (11) or (15) described above, in which the channel bonding is performed at the PLP level.

(17)

The receiving apparatus according to (16) described above, in which information associated with the channel bonding is included as signaling of an upper layer higher than the physical layer in the PLP ineligible for the channel bonding.

(18)

The receiving apparatus according to any one of (11) to (17) described above, in which the broadcasting signal includes a division stream obtained through division of one stream together with the physical layer signaling, the receiving apparatus further includes a processing section processing the division stream, the receiving section is provided for each frequency band utilized in the channel bonding, and the processing section processes a plurality of division streams obtained from the plurality of broadcasting signals received by the receiving section to reconstitute an original stream.

(19)

The receiving apparatus according to any one of (11) to (18) described above, in which the transmitting apparatus is installed in a transmitting station, the relay apparatus is installed in a relay stream, and the transmitting apparatus and the relay apparatus constitute the multi frequency networks (MFN).

(20)

A data processing method in a receiving apparatus including the steps of:

by the receiving apparatus, receiving a broadcasting signal which is transmitted from a transmitting apparatus and which is changed in frequency band thereof by a relay apparatus; and processing physical layer signaling which is included in the broadcasting signal and which includes first identification information with which a group of frequency bonds constituting channel bonding is identified, and second identification information with which the frequency band belonging to the group is identified.

REFERENCE SIGNS LIST

2 . . . Broadcasting system, 10, 10-1, 10-2 . . . Transmitting apparatus, 20, 20-1, 20-2 . . . Relay apparatus, 30 . . . Receiving apparatus, 101 . . . Receiving section, 102 . . . Data processing section, 103 . . . Transmitting section, 111 . . . Generation section, 121 . . . Modulation section, 301, 301-1, 301-2 . . . Receiving section, 302 . . . Data processing section, 303 . . . Output section, 311-1, 311-2 . . . Demodulation section, 321 . . . Processing section, 1000 . . . Computer, 1001 . . . CPU

The invention claimed is:

1. A transmitting apparatus comprising:
a generation section generating physical layer signaling including first identification information with which a group of frequency bands constituting channel bonding is identified, and second identification information with which a frequency band belonging to the group is identified; and
a transmitting section transmitting a broadcasting signal which includes the physical layer signaling and is changed in frequency band thereof by a relay apparatus by utilizing a predetermined frequency band.

2. The transmitting apparatus according to claim 1, wherein
the first identification information is an identifier allocated to a frequency band of a physical layer, and
the second identification information is an identifier which is a unique value within the group and is allocated to a frequency band utilized at the time of transmission.

3. The transmitting apparatus according to claim 2, wherein
the first identification information is an identifier which is common within the group and is allocated to any one of frequency bands of the physical layer within the group.

4. The transmitting apparatus according to claim 2, wherein
the physical layer signaling includes only one set of the first identification information and the second identification information.

5. The transmitting apparatus according to claim 2, wherein
the physical layer signaling includes a prospective reserved region together with a set of the first identification information and the second identification information within a loop corresponding to the number of frequency bands belonging to the group.

6. The transmitting apparatus according to claim 1, wherein
the channel bonding is performed at a PLP (Physical Layer Pipe) level.

7. The transmitting apparatus according to claim 6, wherein
information associated with the channel bonding is included as signaling of an upper layer higher than the physical layer in the PLP ineligible for the channel bonding.

8. The transmitting apparatus according to claim 1, wherein
the broadcasting signal includes a division stream obtained through division of one stream together with the physical layer signaling.

9. The transmitting apparatus according to claim 1, wherein
the transmitting apparatus is installed in a transmitting station,
the relay apparatus is installed in a relay station, and
the transmitting apparatus and the relay apparatus constitute multi frequency networks (MFN).

10. A data processing method of a transmitting apparatus, comprising the steps of:
by the transmitting apparatus,
generating physical layer signaling including first identification information with which a group of frequency bands constituting channel bonding is identified, and second identification information with which the frequency bands belonging to the group are identified; and
transmitting a broadcasting signal which includes the physical layer signaling and is changed in frequency band thereof by a relay apparatus by utilizing a predetermined frequency band.

11. A receiving apparatus comprising:
a receiving section receiving a broadcasting signal which is transmitted from a transmitting apparatus and which is changed in frequency band thereof by a relay apparatus,
wherein the receiving section processes physical layer signaling which is included in the broadcasting signal and which includes first identification information with which a group of frequency bands constituting channel bonding is identified, and second identification information with which the frequency band belonging to the group is identified.

12. The receiving apparatus according to claim 11, wherein
the first identification information is an identifier allocated to a frequency band of a physical layer, and
the second identification information is an identifier which is a unique value within the group and is allocated to a frequency band utilized at the time of transmission.

13. The receiving apparatus according to claim 12, wherein
the first identification information is an identifier which is common within the group and is allocated to any one of frequency bands of the physical layer within the group.

14. The receiving apparatus according to claim 12, wherein
the physical layer signaling includes only one set of the first identification information and the second identification information.

15. The receiving apparatus according to claim 12, wherein
the physical layer signaling includes a prospective reserved region together with a set of the first identification information and the second identification information within a loop corresponding to the number of frequency bands belonging to the group.

16. The receiving apparatus according to claim 11, wherein
the channel bonding is performed at the PLP level.

17. The receiving apparatus according to claim 16, wherein
information associated with the channel bonding is included as signaling of an upper layer higher than the physical layer in the PLP ineligible for the channel bonding.

18. The receiving apparatus according to claim 11, wherein
the broadcasting signal includes a division stream obtained through division of one stream together with the physical layer signaling,
the receiving apparatus further comprises a processing section processing the division stream,
the receiving section is provided for each frequency band utilized in the channel bonding, and
the processing section processes a plurality of division streams obtained from the plurality of broadcasting signals received by the receiving section to reconstitute an original stream.

19. The receiving apparatus according to claim 11, wherein
- the transmitting apparatus is installed in a transmitting station,
- the relay apparatus is installed in a relay stream, and
- the transmitting apparatus and the relay apparatus constitute the multi frequency networks (MFN).

20. A data processing method of a receiving apparatus, comprising the steps of:
- by the receiving apparatus,
- receiving a broadcasting signal which is transmitted from a transmitting apparatus and which is changed in frequency band thereof by a relay apparatus; and
- processing physical layer signaling which is included in the broadcasting signal and which includes first identification information with which a group of frequency bonds constituting channel bonding is identified, and second identification information with which the frequency band belonging to the group is identified.

* * * * *